(12) United States Patent
Kitagawa et al.

(10) Patent No.: US 7,639,339 B2
(45) Date of Patent: Dec. 29, 2009

(54) LIQUID CRYSTAL DISPLAY DEVICE HAVING SUBSTRATE SPACERS ENGAGING WITH CONTACT HOLES THAT CONTACT PIXEL ELECTRODE WITH THE ELECTRODES OF SWITCHING ELEMENTS

(75) Inventors: Hideki Kitagawa, Mie (JP); Osamu Sugimoto, Mie (JP); Kouichi Sawada, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 72 days.

(21) Appl. No.: 11/144,300

(22) Filed: Jun. 3, 2005

(65) Prior Publication Data

US 2005/0270471 A1 Dec. 8, 2005

(30) Foreign Application Priority Data

Jun. 3, 2004 (JP) .............................. 2004-166165

(51) Int. Cl.
*G02F 1/1339* (2006.01)
(52) U.S. Cl. .......................... 349/155; 349/156; 349/157
(58) Field of Classification Search .......... 349/155–157
See application file for complete search history.

(56) References Cited

U.S. PATENT DOCUMENTS

| 6,441,879 | B2 * | 8/2002 | Hiraishi et al. ............. 349/155 |
| 6,465,268 | B2 | 10/2002 | Hirakata et al. |
| 6,583,846 | B1 * | 6/2003 | Yanagawa et al. .......... 349/155 |
| 6,724,447 | B2 * | 4/2004 | Kim ............................ 349/106 |
| 6,743,650 | B2 | 6/2004 | Hirakata et al. |
| 6,870,592 | B1 * | 3/2005 | Yamamoto et al. .......... 349/155 |
| 2002/0109815 | A1 * | 8/2002 | Hirakata et al. ............. 349/155 |
| 2004/0207789 | A1 | 10/2004 | Hirakata et al. |
| 2004/0218112 | A1 | 11/2004 | Hirakata et al. |
| 2004/0223109 | A1 * | 11/2004 | Taniguchi et al. ........... 349/156 |
| 2005/0190338 | A1 * | 9/2005 | Lim ........................... 349/156 |

FOREIGN PATENT DOCUMENTS

| JP | 04-122914 | | 4/1992 |
| JP | 10-325959 | A | 12/1998 |
| JP | 2003-279997 | A | 10/2003 |
| JP | 2004-029386 | A | 1/2004 |

OTHER PUBLICATIONS

Official communication issued in the counterpart Japanese Application No. 2004-166165, mailed on Jun. 5, 2007.
Official communication issued in counterpart Japanese Application No. 2004-166165, mailed on Oct. 30, 2007.

* cited by examiner

*Primary Examiner*—David Nelms
*Assistant Examiner*—Lauren Nguyen
(74) *Attorney, Agent, or Firm*—Keating & Bennett, LLP

(57) ABSTRACT

In a liquid crystal display device including an array substrate which is provided with contact holes and a counter substrate which is provided with integral spacers and aligned with the array substrate, an overall region including every pixel region is divided into a plurality of subregions, each of which includes two or more said spacers and is composed of at least one said pixel region. The spacers are so arranged that when one or some of the spacers are positioned to get into the corresponding contact holes, the rest of the spacers are positioned off the corresponding contact holes. By so doing, a uniform gap is provided between the substrates even if accuracy in aligning the substrates with each other is not considerably high.

4 Claims, 10 Drawing Sheets

←

LIQUID CRYSTAL DISPLAY DEVICE HAVING SUBSTRATE SPACERS ENGAGING WITH CONTACT HOLES THAT CONTACT PIXEL ELECTRODE WITH THE ELECTRODES OF SWITCHING ELEMENTS

CROSS-REFERENCE TO RELATED APPLICATION

This non-provisional application claims priority under 35 U.S.C. §119(a) on Patent Application No. 2004-166165 filed in Japan on Jun. 3, 2004, the entire contents of which are hereby incorporated by reference.

BACKGROUND OF THE INVENTION (a) Field of the Invention

The present invention relates to a liquid crystal display device including an array substrate which is provided with contact holes and a counter substrate which is provided with spacers and aligned with the array substrate. In particular, it relates to measures to prevent the formation of an uneven gap between the substrates derived from the spacers which have got into the contact holes.

(b) Description of Related Art

In general, liquid crystal display devices include a plurality of spacers provided between an array substrate and a counter substrate to give a uniform gap between the substrates. If spherical spacers are provided between the substrates by spraying, cohesion of the spacers is likely to occur. Therefore, in recent years, a substrate provided with integral columnar spacers is commonly employed as one of the substrates. For example, Japanese Unexamined Patent Publication No. H4-122914 describes (see page 2 of the official gazette and FIG. 2) a liquid crystal display device, in which integral spacers are formed on a color filter substrate (counter substrate) provided with counter electrodes.

From the viewpoint of preventing irregular display derived from the presence of the spacers, it is preferred to arrange the spacers at positions corresponding to supplementary capacitor bus lines (hereinafter may be referred to as Cs bus lines) which are larger in width than gate bus lines.

On the other hand, in a liquid crystal display device including an array substrate provided with a protective insulator which is formed between pixel electrodes and some of electrodes of TFTs closer to the pixel electrodes, contact holes are formed in the protective insulator to electrically connect the pixel electrodes and the electrodes of the TFTs.

Therefore, if accuracy in aligning the counter substrate including the spacers with the array substrate is not high, the counter substrate may be misaligned with the array substrate 100, for example, in the direction of an arrow indicated in a schematic plan view of FIG. 10, and therefore the spacers 200 may get into contact holes 300. In such a case, the gap between the array substrate 100 and the counter substrate is not kept uniform, whereby proper display cannot be achieved.

For this reason, measures have been taken so far to arrange the spacers 200 on the counter substrate with high accuracy and to align the counter substrate with the array substrate 100 with as high accuracy as possible.

However, as a pixel pitch has been getting smaller in response to recent demands for high definition, extremely high accuracy is required to align the substrates with each other according to the conventional technique. That is, the problem of great difficulty in aligning the substrates with each other remains unsolved.

SUMMARY OF THE INVENTION

Under these circumstances, the present invention has been achieved. A principle object of the present invention is to provide a uniform gap between an array substrate provided with contact holes and a counter substrate provided with columnar spacers even if accuracy in aligning the substrates with each other is not considerably high.

To achieve the object, in the present invention, an overall region including every pixel region is divided into a plurality of subregions. In each of the subregions, the spacers are so arranged that when one or some of the spacers are positioned to get into the contact holes, the rest of the spacers are positioned off the contact holes, thereby providing a gap. By so doing, a uniform gap is obtained between the array substrate and the counter substrate even if the accuracy in aligning the substrates with each other is not so high.

More specifically, the present invention is directed to a liquid crystal display device comprising: an array substrate which includes a plurality of pixel regions, in each of which a pixel electrode is electrically connected to one of electrodes of a switching element closer to the pixel electrode through a contact hole formed in a protective insulator provided between the pixel electrode and the electrode of the switching element; a counter substrate which is arranged to face the array substrate and aligned with the array substrate; a plurality of spacers which are formed integrally with the counter substrate to provide a gap between the array substrate and the counter substrate; and a liquid crystal layer which is provided between the array substrate and the counter substrate.

In the liquid crystal display device, an overall region including every pixel region is divided into a plurality of subregions, each of which includes two or more said spacers and is composed of at least one said pixel region. Further, the spacers in each of the subregions are so arranged that when one or some of the spacers are positioned to get into the corresponding contact holes, the rest of the spacers are positioned off the corresponding contact holes.

If the array substrate is provided with supplementary capacitor bus lines for storing charge in the pixel electrodes, the spacers may be arranged in positions corresponding to the supplementary capacitor bus lines.

Further, if each of the subregions includes two or more pixel regions, the spacers in each subregion may be formed in one or some of the pixel regions.

DETAILED DESCRIPTION OF THE INVENTION

Hereinafter, with reference to the drawings, an explanation is given of an embodiment of the present invention.

Figure 1:
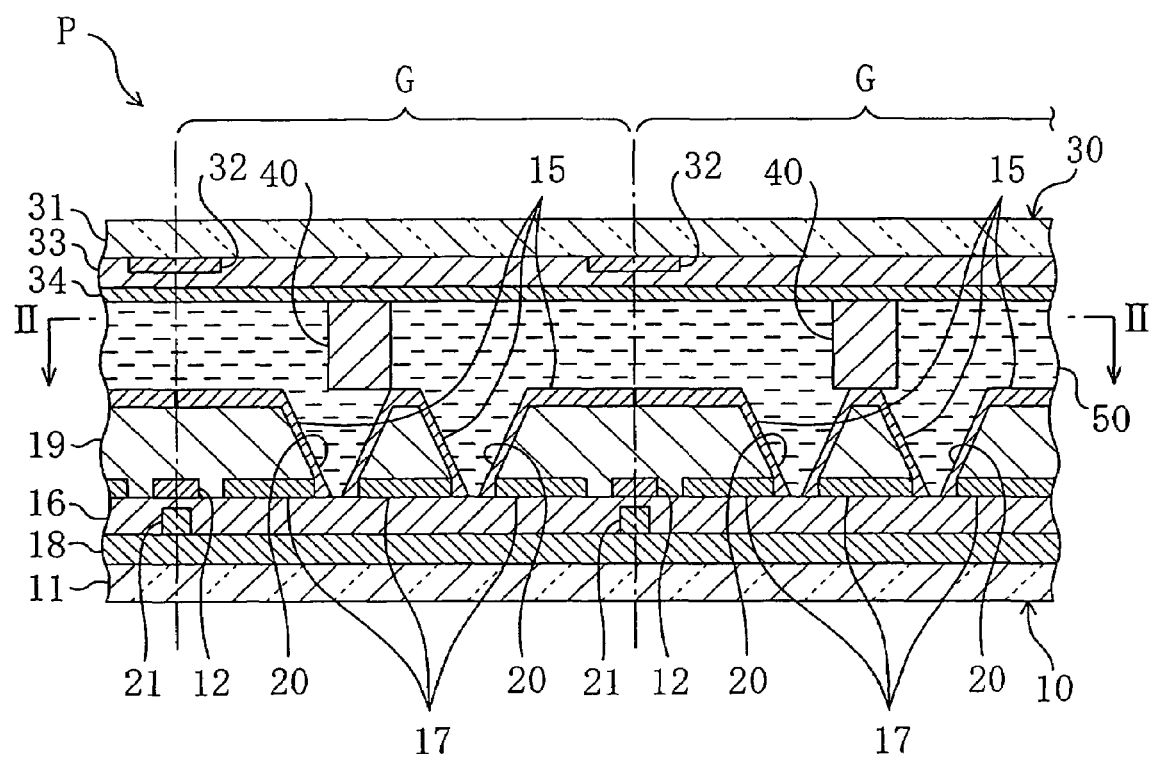
FIG. 1 is a schematic sectional view illustrating the configuration of a major part of a liquid crystal display device according to an embodiment of the present invention.
Figure 2:
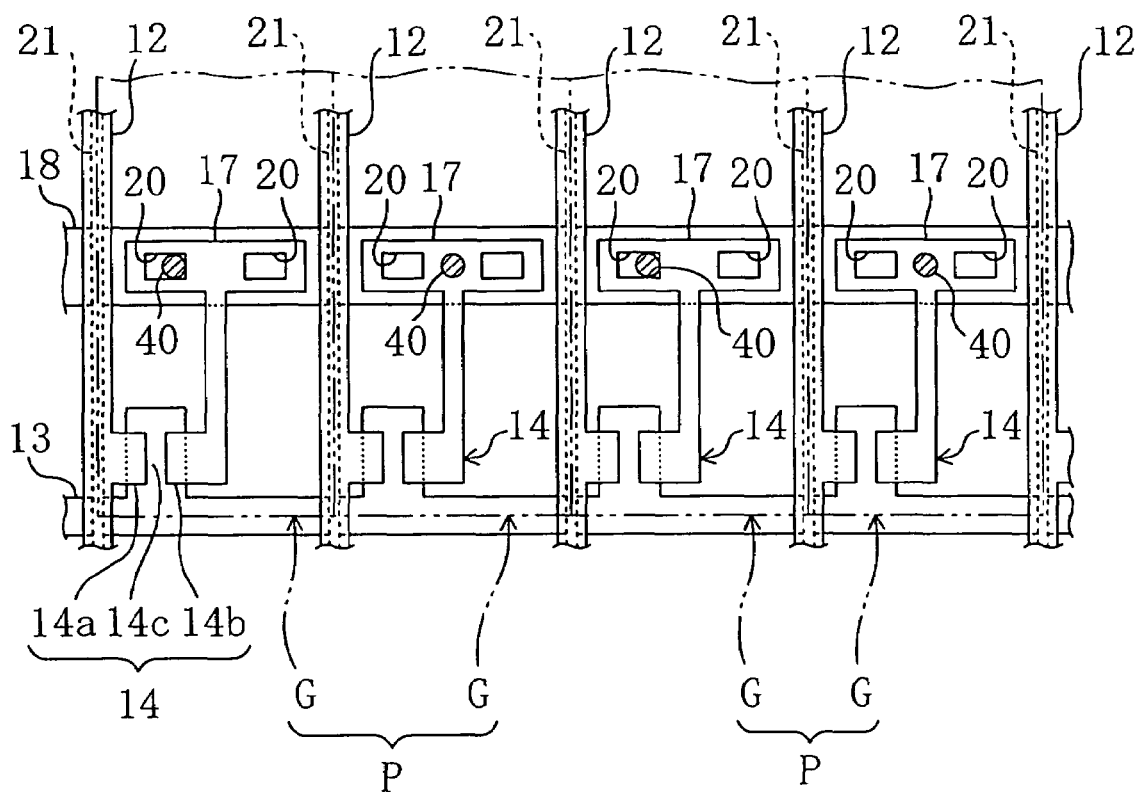
FIG. 2 is a sectional view taken along the line II-II shown in FIG. 1.
Figure 3:
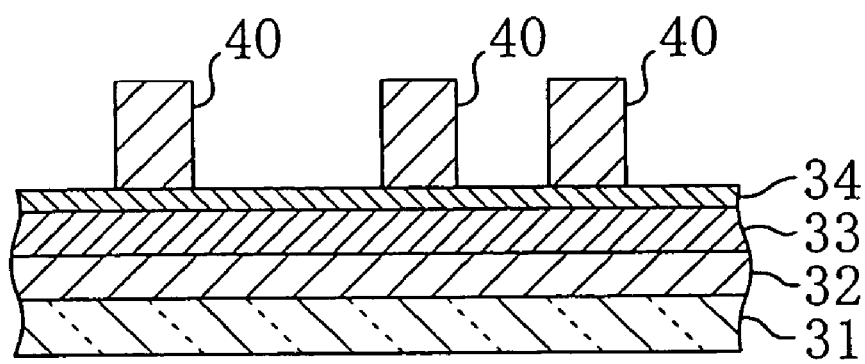
FIG. 3 is a schematic sectional view illustrating the configuration of a CF substrate.

FIGS. 1 and 2 schematically illustrate the configuration of a liquid crystal display device according to the embodiment of the present invention. FIG. 1 is a schematic sectional view illustrating the configuration of a major part of the liquid crystal display device, while FIG. 2 is a sectional view taken along the line II-II shown in FIG. 1. The liquid crystal display device is an active matrix liquid crystal display device including TFTs (thin film transistors) for driving pixel electrodes. Further, the liquid crystal display device is a transmissive display device in which a backlight is arranged at the back of a liquid crystal display panel to bring light to the liquid crystal display panel and the amount of light passing through the liquid crystal display panel is controlled on a pixel-by-pixel basis.

The liquid crystal display device includes an array substrate 10 which is provided with a plurality of TFTs arranged in a matrix configuration and a color filter substrate 30 (hereinafter referred to as a CF substrate) which is provided with a color filter layer and aligned as a counter substrate with the array substrate 10. Further, a liquid crystal layer 50 is provided between the array substrate 10 and the CF substrate 30.

The array substrate 10 includes a transparent glass substrate 11. On the glass substrate 11, a plurality of data bus lines 12 extending in the longitudinal direction (up-down direction in FIG. 2) are formed and a plurality of gate bus lines 13 extending in the horizontal direction (left-right direction in FIG. 2) are formed to intersect with the data bus lines 12. TFTs 14, each of which includes a source electrode 14a, a drain electrode 14b and a gate electrode 14c, are formed in the vicinity of the intersections of the bus lines 12 and 13, respectively. Further, pixel electrodes 15 are formed and electrically connected to the drain electrodes 14b, respectively. Each of the source electrodes 14a of the TFTs 14 is electrically connected to the data bus line 12 crossing the intersection, while each of the gate electrodes 14c of the TFTs 14 is electrically connected to the gate bus line 13 crossing the intersection. The data bus lines 12, the source electrodes 14a and the drain electrodes 14b are electrically insulated from the gate bus lines 13 and the gate electrodes 14c by a gate insulator 16. Each of the drain electrodes 14b extends from the TFT 14 to the almost center of a pixel region G and the end portion thereof is defined as a supplementary capacitor electrode 17 (hereinafter referred to as a Cs electrode) which is almost rectangular and extends parallel to the gate bus lines 13. Further, Cs bus lines 18 are formed to extend parallel to the gate bus lines 13 on the side of the gate insulator 16 opposite to the Cs electrodes 17. In each pixel region G, the Cs bus line 18 and the Cs electrode 17 provide a supplementary capacitor.

A protective insulator 19 is formed on the data bus lines 12, source electrodes 14a, drain electrodes 14b and Cs electrodes 17. The pixel electrodes 15 are formed on the protective insulator 19. Each of the pixel electrodes 15 is provided to cover almost every part of each pixel region G. The edge portion of the pixel electrode 15 overlaps the corresponding parts of two data bus lines 12 and two gate bus lines 13 which define the pixel region G.

In each pixel region G, two contact holes 20 are formed in part of the protective insulator 19 corresponding to the Cs electrode 17. The Cs electrode 17, i.e., the drain electrode 14b of the TFT 14, is electrically connected to the pixel electrode 15 through the contact holes 20. In FIGS. 1 and 2, reference numeral 21 indicates ohmic contact layers 21 which extend along the data bus lines 12 below the data bus lines 12. The ohmic contact layers 21 have the function of preventing a break in the data bus lines 12, for example.

The CF substrate 30 also includes a transparent glass substrate 31. On the glass substrate 31, a light shield layer 32 (black matrix) is formed at positions corresponding to regions where light leakage occurs, e.g., the peripheries of the data bus lines 12, gate bus lines 13, TFTs 14 and Cs bus lines 18 of the array substrate 10. Further, a color filter layer 33 is formed on the light shield layer 32. The color filter layer 33 includes R (red), G (green) and B (blue) layers which are arranged in a predetermined configuration, i.e., one by one corresponding to the pixel regions G. That is, in this embodiment, a "pixel" indicates a subpixel (dot). On the color filter layer 33, a transparent counter electrode 34 made of an ITO film, for example, is formed over the pixel regions G. Further, columnar spacers 40 are formed on the counter electrode 34 such that a predetermined gap is provided between the CF substrate 30 and the array substrate 10. The columnar spacers 40 are arranged in the pixel regions G on a one-by-one basis.

Now, an explanation is given of the steps of manufacturing the thus-configured liquid crystal display device.

First, as to the array substrate 10, a gate film is formed on the glass substrate 11 by sputtering and then patterned into the gate bus lines 13, gate electrodes 14c and Cs bus lines 18.

Then, the gate insulator 16 is formed by CVD, and then the data bus lines 12, source electrodes 14a, drain electrodes 14b and Cs electrodes 17 are formed thereon. Thus, the TFTs 14 are obtained.

Then, the protective insulator 19 is formed and a transparent conductive film is formed thereon by sputtering. Then, the transparent conductive film is patterned into the pixel electrodes 15. The pixel electrodes 15 are electrically connected to the Cs electrodes 17, i.e., the drain electrodes 14b of the TFTs 14, through the contact holes 20 formed in the protective insulator 19.

As to the CF substrate 30, the light shield layer 32 is formed on the glass substrate 31 and the color filter layer 33 is formed on part of the substrate where the light shield layer 32 has been provided. Then, the counter electrode 34 is formed on the color filter layer 32 and the columnar spacers 40 are formed thereon.

In this embodiment, an overall region including every pixel region G is divided into a plurality of subregions P. Each of the subregions P is composed of two of the pixel regions G arranged side by side in the direction of extension of the gate bus lines 13 (left-right direction in FIG. 2) and two of the columnar spacers 40. The two columnar spacers 40 in each of the subregions P are so arranged that when one of the columnar spacers 40 is positioned to get into the contact hole 20 upon aligning the CF substrate 30 with the array substrate 10, the other is positioned off the contact hole 20.

More specifically, the columnar spacers 40 are so arranged that when the columnar spacer 40 in the left pixel region G in the subregion P as seen in FIG. 2 is positioned to get into the left one of the contact holes 20, the columnar spacer 40 in the right pixel region G in the subregion P is positioned substantially in the middle of the two contact holes 20.

Thus, according to this embodiment, the overall region including every pixel region G is divided into a plurality of subregions P, each of which includes two of the pixel regions G arranged side by side in the direction of extension of the gate bus lines 13 and two of the columnar spacers 40. Further, the two columnar spacers 40 in each of the subregions P are so arranged that when one of the columnar spacers 40 is positioned to get into the contact hole 20 upon aligning the CF substrate 30 with the array substrate 10, the other is positioned off the contact hole 20. Therefore, even if accuracy in aligning the CF substrate 30 with the array substrate 10 is not so high, at least one of the columnar spacers 40 in the subregion P provides a predetermined gap between the substrates. As a result, the gap between the array substrate 10 and the CF substrate 30 becomes uniform in the overall region.

Further, the columnar spacers 40 on the CF substrate 30 are arranged in positions corresponding to the Cs bus lines 18 in the array substrate 10. Therefore, the positioning of the columnar spacers 40 is easier than the case where the spacers 40 are arranged in positions corresponding to the gate bus lines 13 which are smaller in width than the Cs bus lines 18.

Figure 4:
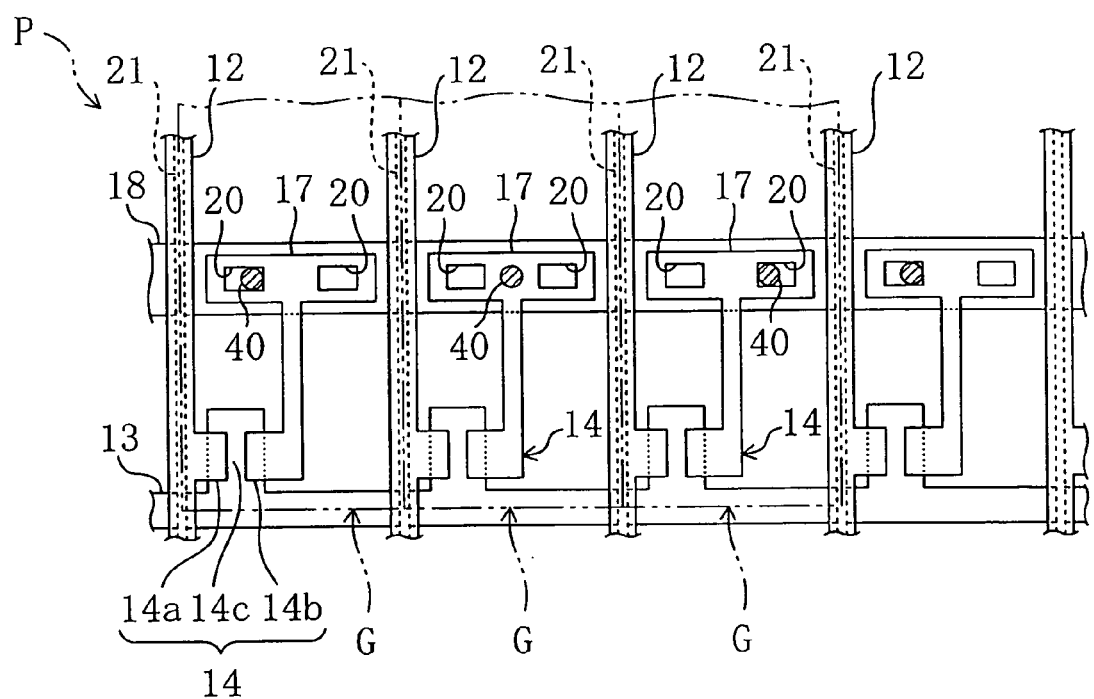
FIG. 4 is a view corresponding to FIG. 2 illustrating Variation 1 of the embodiment.
Figure 5:
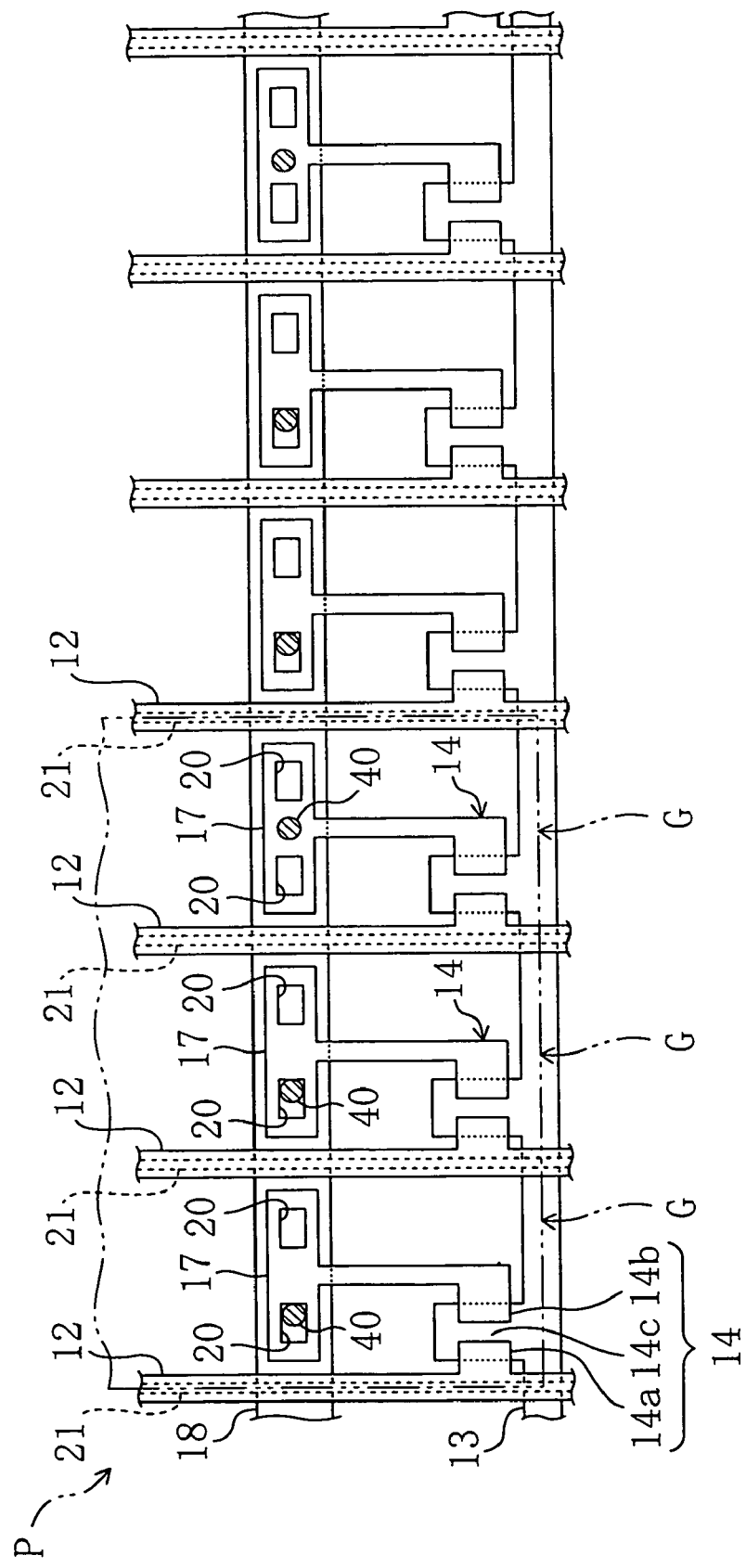
FIG. 5 is a view corresponding to FIG. 2 illustrating Variation 2 of the embodiment.
Figure 6:
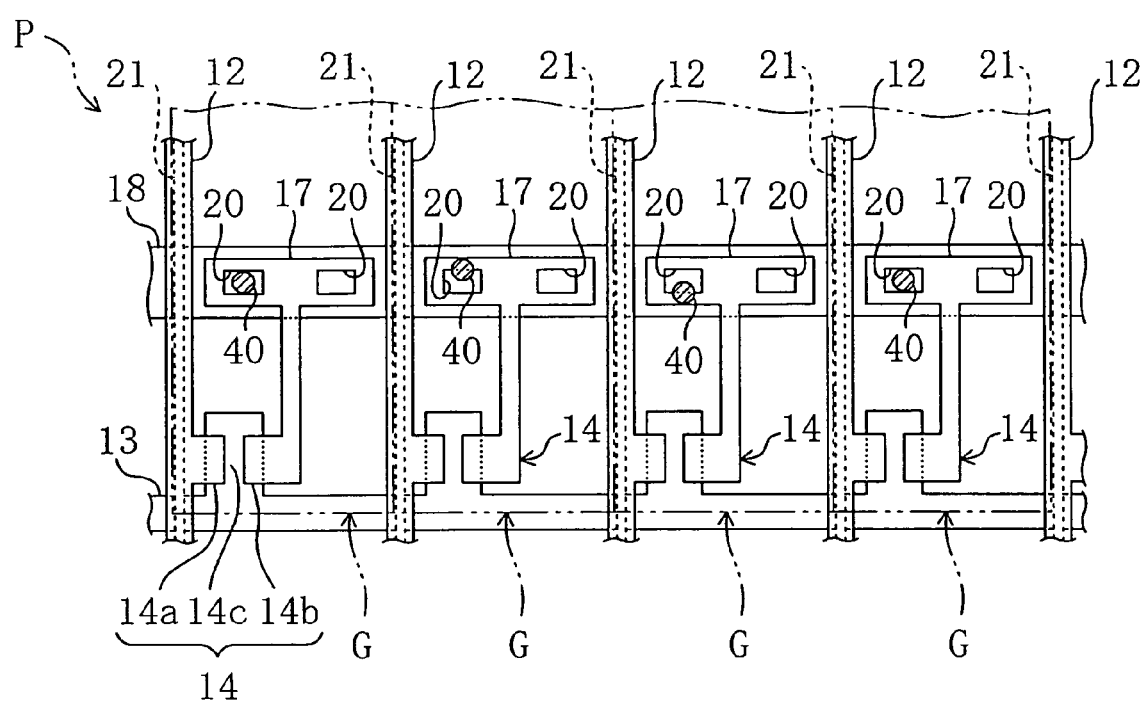
FIG. 6 is a view corresponding to FIG. 2 illustrating Variation 3 of the embodiment.

In the above embodiment, each of the subregions P is composed of two pixel regions G. On the other hand, the subregion P may be composed of three or more pixel regions G. For example, if the subregion P is composed of three pixel regions G each having a single columnar spacer 40, the spacers 40 may be so arranged that when one or some (e.g., two) of the three columnar spacers 40 are positioned to get into the contact holes, the rest of the columnar spacers 40 are positioned off the contact holes 20 as in Variations 1 and 2 of the present embodiment shown in FIGS. 4 and 5. Alternatively, if the subregion P is composed of four pixel regions G, the columnar spacers 40 may be so arranged that when one or some (e.g., two) of the four columnar spacers 40 are positioned to get into the contact holes 20, the rest of the columnar spacers 40 are positioned off the contact holes 20 as in Variation 3 of the present embodiment shown in FIG. 6.

In the above embodiment, the subregion P is composed of two to four pixel regions G. However, the subregion P may be formed of a single pixel region G. In such a case, two or more columnar spacers 40 are provided in the pixel region G.

Figure 7:
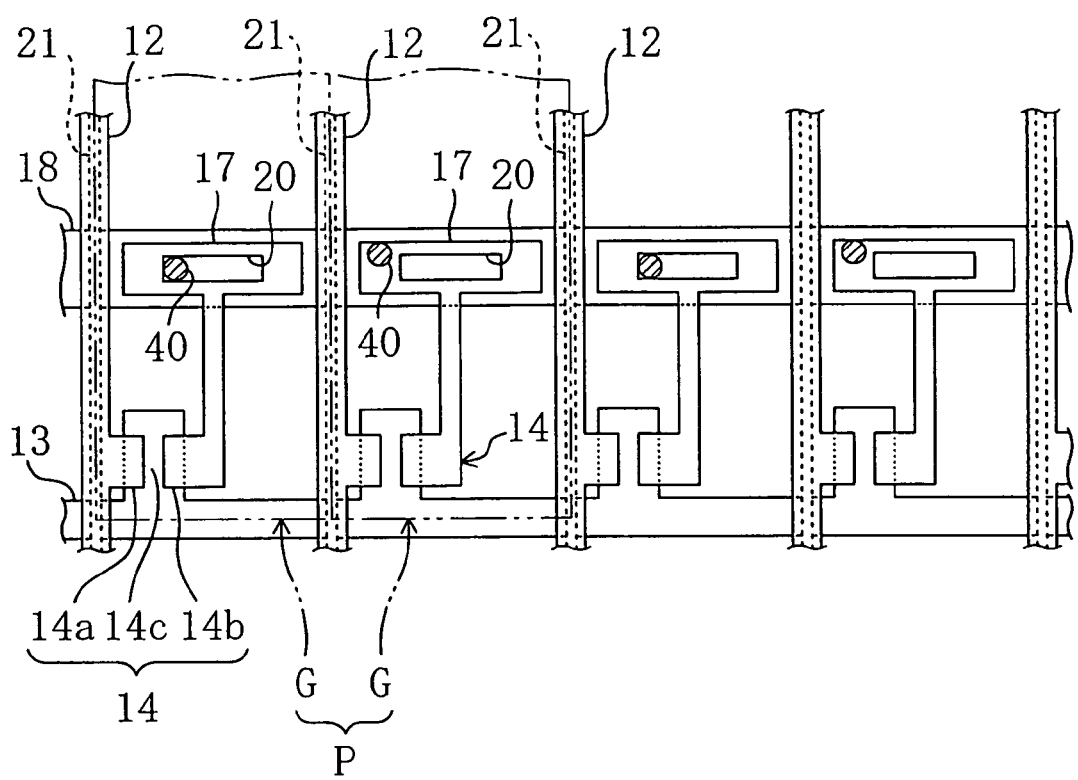
FIG. 7 is a view corresponding to FIG. 2 illustrating Variation 4 of the embodiment.

In the above embodiment, the positions of the columnar spacers 40 are changed in the direction of extension of the gate bus lines 13. However, the positions of the columnar spacers 40 may be changed in a different direction, e.g., in the direction of extension of the data bus lines 12 as in Variation 3. Or alternatively, the positions of the columnar spacers 40 may be changed in two directions of extension of the gate bus lines 13 and the data bus lines 12 as in Variation 4 shown in FIG. 7.

Figure 8:
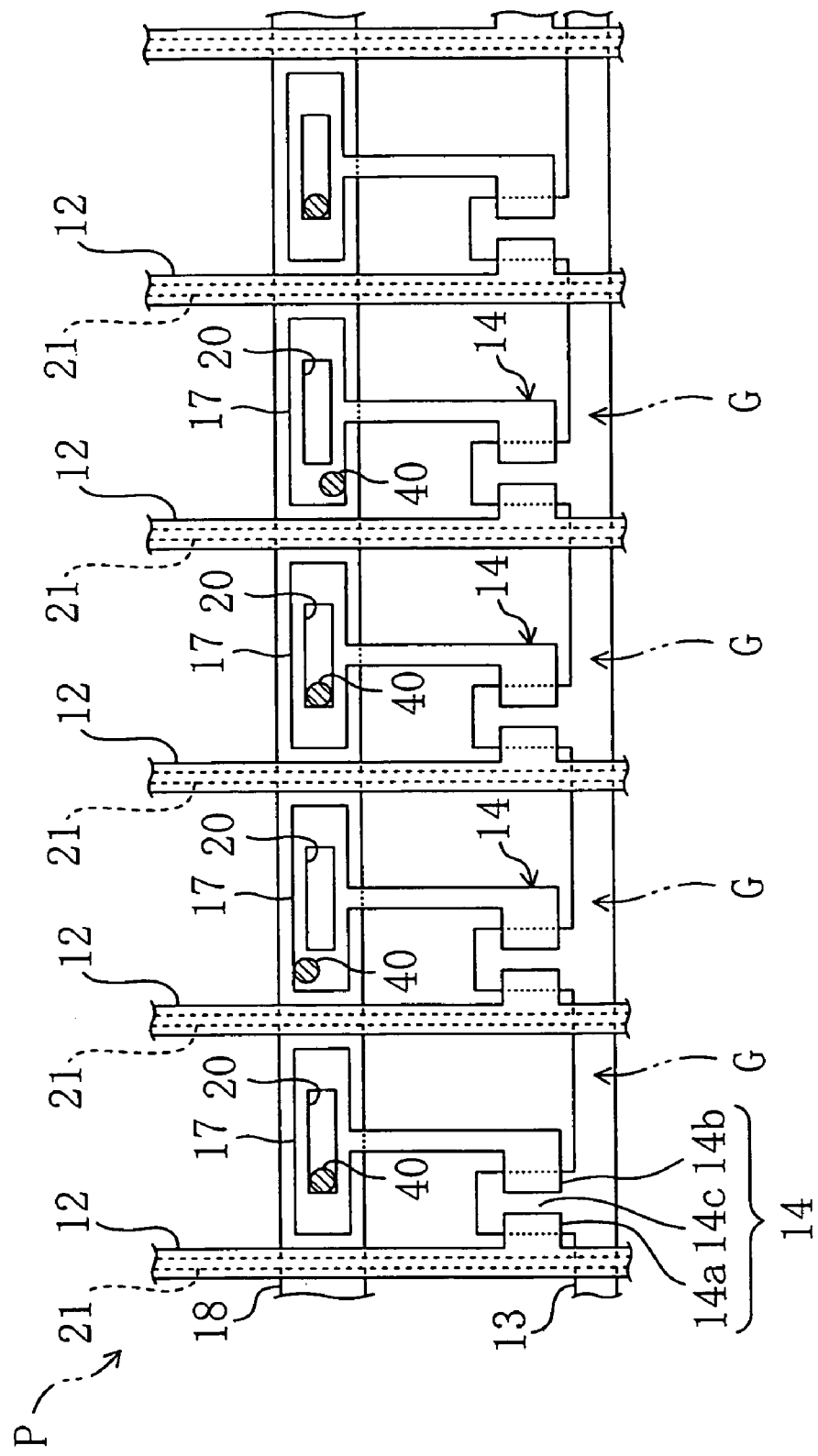
FIG. 8 is a view corresponding to FIG. 2 illustrating Variation 5 of the embodiment.
Figure 9:
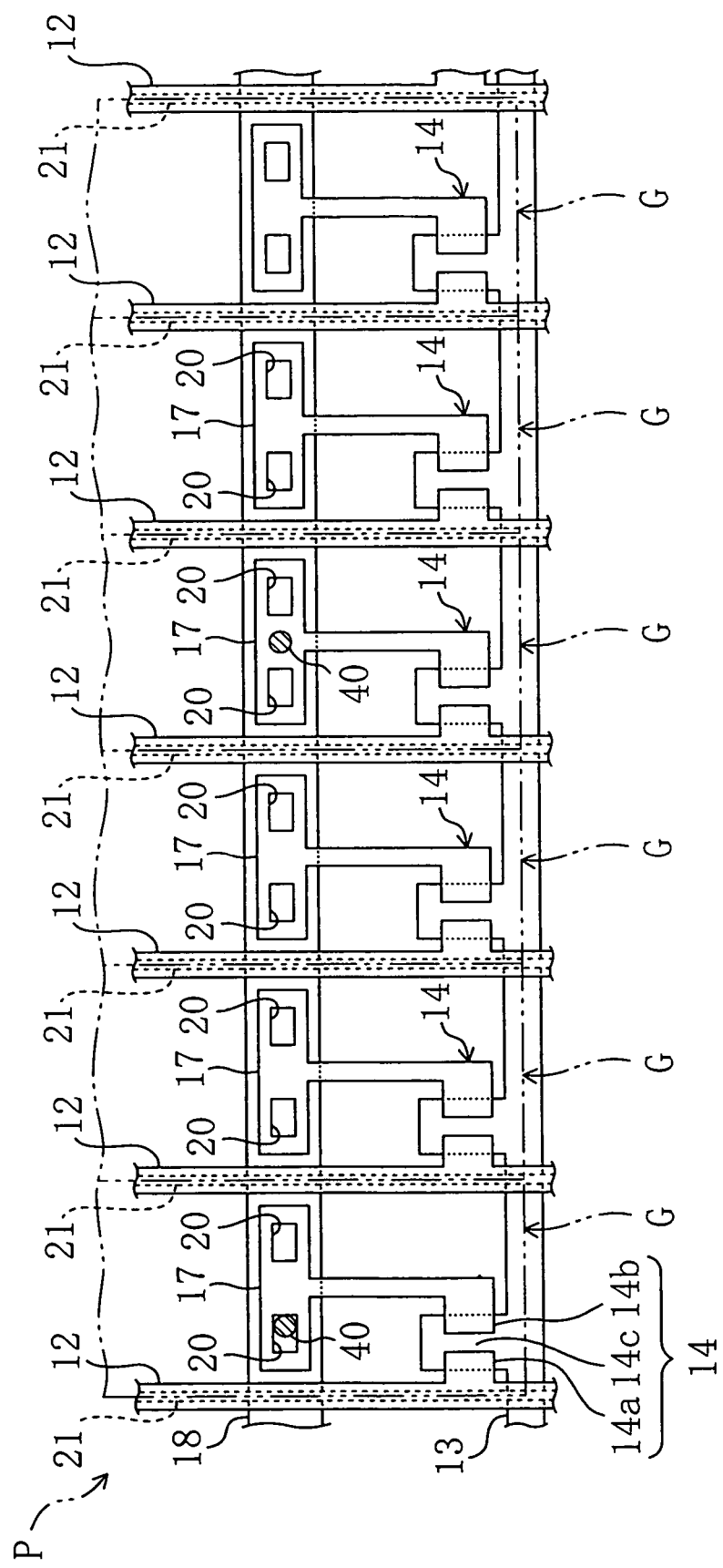
FIG. 9 is a view corresponding to FIG. 2 illustrating Variation 6 of the embodiment.
Figure 10:
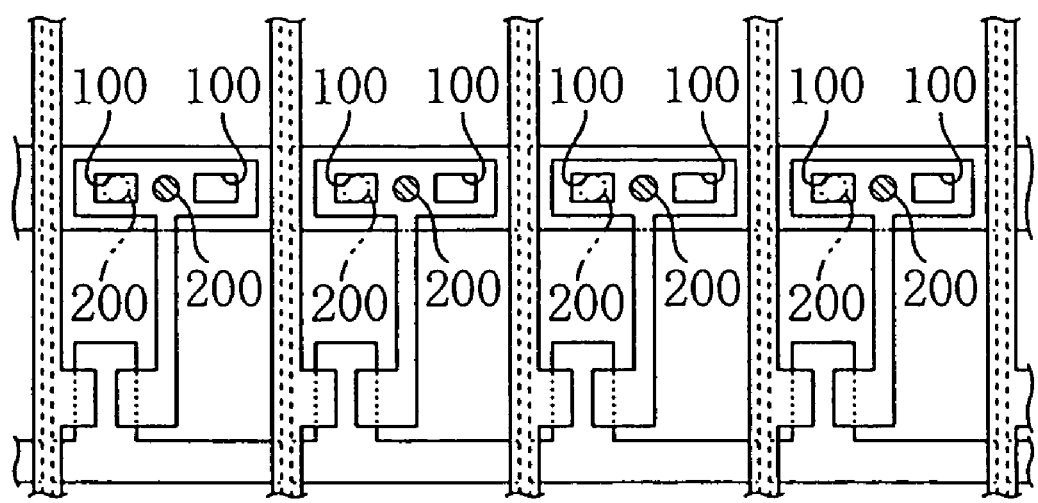
FIG. 10 is a view corresponding to FIG. 1 illustrating an array substrate of a conventional liquid crystal display device as seen from a counter substrate.

In the above embodiment, two contact holes 20 are formed in each of the pixel regions G. However, each of the pixel regions G may be provided with a single contact hole 20 as in Variation 4 mentioned above and Variation 5 shown in FIG. 8. Or alternatively, the pixel region G may be provided with three or more contact holes 20.

In the above embodiment, every pixel region G in the subregion P is provided with the columnar spacer 40. However, for example, in a high-definition liquid crystal display device in which a pixel pitch is small, one or some of the pixel regions G in the subregion P may be provided with the columnar spacer(s) 40, while the rest of the pixel regions G are not provided with the columnar spacers 40.

What is claimed is:

1. A liquid crystal display device comprising:
    an array substrate which includes a plurality of pixel regions, in each of which a pixel electrode is electrically connected to one of electrodes of a switching element closer to the pixel electrode through a contact hole formed in a protective insulator provided between the pixel electrode and the electrode of the switching element;
    a counter substrate which is arranged to face the array substrate and aligned with the array substrate;
    a plurality of spacers which are formed integrally with the counter substrate to provide a gap between the array substrate and the counter substrate; and
    a liquid crystal layer which is provided between the array substrate and the counter substrate; wherein
    the plurality of pixel regions is divided into a plurality of subregions, each of which includes at least:
        a first pixel region having at least one spacer and at least one contact hole; and
        a second pixel region having at least one spacer and at least one contact hole;
    both the first pixel region and the second pixel region include a contact hole engaged with a corresponding spacer;
    all of the spacers in the first pixel region and the second pixel region are engaged with a respective one of the contact holes; and
    in each of the subregions, an arrangement of all of the spacers within the first pixel region with respect to all of the contact holes within the first pixel region is different from an arrangement of all of the spacers within the second pixel region with respect to all of the contact holes within the second pixel region.

2. A liquid crystal display device according to claim 1, wherein
    the array substrate is provided with supplementary capacitor bus lines for storing charge in the pixel electrodes and
    the spacers are arranged in positions corresponding to the supplementary capacitor bus lines.

3. A liquid crystal display device according to claim 1, wherein
    each of the subregions includes two or more pixel regions and
    the spacers in each subregion are formed in one or some of the pixel regions.

4. A liquid crystal display device according to claim 1, wherein all of the plurality of spacers have substantially the same shape.

* * * * *